United States Patent
Hamm et al.

(10) Patent No.: US 11,695,746 B2
(45) Date of Patent: *Jul. 4, 2023

(54) MULTI-LAYER USER AUTHENTICATION WITH LIVE INTERACTION

(71) Applicant: Wells Fargo Bank, N.A., San Francisco, CA (US)

(72) Inventors: Laurie Jean Hamm, Charlotte, NC (US); Patricia L. Hinrichs, Phoenix, AZ (US); Bryan C. Partyka, Charlotte, NC (US); Michael L. Casper, Mint Hill, NC (US); Maryanne G. Genus, Rock Hill, SC (US); Natalie Holm, Midland, NC (US); Claes Dahlstrand, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,939

(22) Filed: Nov. 8, 2021

(65) Prior Publication Data

US 2022/0060461 A1 Feb. 24, 2022

Related U.S. Application Data

(63) Continuation of application No. 16/229,103, filed on Dec. 21, 2018, now Pat. No. 11,171,938.

(51) Int. Cl.
*H04L 29/06* (2006.01)
*H04L 9/40* (2022.01)
*G06N 20/00* (2019.01)

(52) U.S. Cl.
CPC ............ *H04L 63/08* (2013.01); *H04L 63/102* (2013.01); *G06N 20/00* (2019.01)

(58) Field of Classification Search
None
See application file for complete search history.

(56) References Cited

U.S. PATENT DOCUMENTS

| 8,156,323 | B1 | 4/2012 | Shnowske et al. |
| 8,751,393 | B1 | 6/2014 | Murray et al. |

(Continued)

OTHER PUBLICATIONS

Mansour, Abdeljebar et al. A context-aware Multimodal Biometric Authentication for cloud-empowered systems. 2016 International Conference on Wireless Networks and Mobile Communications (WINCOM). https://ieeexplore.ieee.org/stamp/stamp.jsp?tp=&arnumber=7777227 (Year: 2016).*

(Continued)

*Primary Examiner* — Jeremiah L Avery
(74) *Attorney, Agent, or Firm* — Schwegman Lundberg & Woessner, P.A.

(57) ABSTRACT

Systems and techniques for multi-layer user authentication with live interaction are described herein. An authentication request may be received from a user for secure data stored in a computing system. Contextual data may be received that is associated with authentication information received from the user. It may be determined that the user has passed a first authentication process based on a match between the authentication information and reference authentication information stored in a user profile for the user. A risk score may be generated for the authentication request based on the contextual data and the authentication data. A second authentication process may be identified based on the risk score. A set of secondary authentication information may be received. Data associated with the authentication request may be transmitted upon authentication of the user via the second authentication process based on the set of secondary authentication data.

20 Claims, 5 Drawing Sheets

(56) References Cited

U.S. PATENT DOCUMENTS

| | | | |
|---|---|---|---|
| 8,760,488 | B2 | 6/2014 | Tang et al. |
| 8,788,419 | B2* | 7/2014 | Samuels ............... G06Q 20/04 |
| | | | 705/42 |
| 8,931,071 | B2 | 1/2015 | Newman et al. |
| 8,941,709 | B2 | 1/2015 | Johnson et al. |
| 8,943,568 | B1 | 1/2015 | Hromi et al. |
| 9,210,156 | B1* | 12/2015 | Little ...................... G06F 21/34 |
| 9,565,562 | B1* | 2/2017 | Bar-Menachem ........................... |
| | | | H04W 12/065 |
| 9,747,434 | B1* | 8/2017 | Avital ..................... H04L 67/02 |
| 9,954,860 | B2* | 4/2018 | Wood ................... H04L 63/0884 |
| 10,360,367 | B1* | 7/2019 | Mossoba ................ H04L 63/08 |
| 10,616,196 | B1* | 4/2020 | Khitrenovich ......... G06N 20/00 |
| 2002/0126201 | A1 | 9/2002 | Schmitt et al. |
| 2013/0167044 | A1 | 6/2013 | Graves et al. |
| 2013/0263240 | A1* | 10/2013 | Moskovitch ........ H04L 63/0861 |
| | | | 726/7 |
| 2014/0156499 | A1 | 6/2014 | Cavazos, Jr. |
| 2014/0279489 | A1 | 9/2014 | Russell et al. |
| 2015/0089585 | A1* | 3/2015 | Novack ................... H04L 63/08 |
| | | | 726/3 |
| 2017/0032113 | A1* | 2/2017 | Tunnell ................. H04L 9/3231 |
| 2018/0004151 | A1 | 2/2018 | Burch et al. |
| 2018/0041510 | A1* | 2/2018 | Burch ..................... H04L 63/18 |
| 2018/0159852 | A1* | 6/2018 | Crabtree ............. H04L 63/1433 |
| 2020/0053088 | A1* | 2/2020 | Drake, II ................ H04L 63/08 |
| 2020/0204531 | A1 | 6/2020 | Hamm et al. |

OTHER PUBLICATIONS

Srivastava, Stuti; Sudhish, Prem Sewak. Continuous multi-biometric user authentication fusion of face recognition and keystoke dynamics. 016 IEEE Region 10 Humanitarian Technology Conference (R10-HTC). https://ieeexplore.ieee.org/stamp/stamp.jsp?tp=&arnumber=7906823 (Year: 2016).*

Misbahuddin, Mohammed et al. Design of a risk based authentication system using machine learning techniques. 2017 IEEE SmartWorld/SCALCOM/UIC/ATC/CBDCom/IOP/SCI. https://ieeexplore.ieee.org/stamp/stamp.jsp?tp=&arnumber=8397628 (Year: 2017).*

Aronowitz, Hagai et al. Multi-modal biometrics for mobile authentication. IEEE International Joint Conference on Biometrics, https://ieeexplore.ieee.org/stamp/stamp.jsp?tp=&arnumber=6996269 (Year: 2014).*

Bakar, Khairul Azmi Abu et al. Adaptive authentication based on analysis of user behavior. 2014 Science and Information Conference. https://ieeexplore.ieee.org/stamp/stamp.jsp?tp=&arnumber=6918248 (Year: 2014).*

"U.S. Appl. No. 16/229,103, Notice of Allowance dated Mar. 23, 2021", 10 pgs.

"U.S. Appl. No. 16/229,103, Notice of Allowance dated Jul. 15, 2021", 11 pgs.

"Improve Customer Service at Your Credit Union or Bank with Live Chat", Silver Cloud LLC, [Online]. Retrieved from the Internet: <URL: https://silvercloudinc.com/blog/live-chat-for-banks/ >, (Jan. 23, 2018), 6 pgs.

Mansour, Abdeljebar, "Multi-factor authentication based on multimodal biometrics (MFA-MB) for Cloud Computing", IEEE/ACS 12th International Conference of Computer Systems and Applications (AICCSA), <https://ieeexplore.ieee.org/stamp/stamp.jsp?tp=&arnumber=7507257>, (2015).

Misbahuddin, Mohammed, et al., "Design of a risk based authentication system using machine learning techniques", IEEE SmartWorld/SCALCOM/UIC/ATC/CBDCom/IOP/SCI, <https://ieeexplore.ieee.org/stamp/stamp.jsp?tp=&arnumber=8397628>, (2017).

Phiri, Jackson, et al., "Biometrics, device metrics and pseudo metrics in a multifactor authentication with artificial intelligence", 7th International Conference on Broadband Communications and Biomedical Applications, [Online] Retrieved from the internet: <https://ieeexplore.ieee.org/stamp/stamp.jsp?tp=&arnumber=6217912>, (2011).

Pilcher, Jeffry, "Interative Video Chat: The Future of Mobile Banking", The Financial Brand, [Online]. Retrieved from the Internet: <URL: https://thefinancialbrand.com/59005/interactive-video-chat-mobile-banking/>, (Jun. 1, 2016), 5 pgs.

Prisha, Palpunavam, et al., "Identity risk analysis in mobile commerce: A novel approach", 2018 IEEE Symposium on Computer Applications & Industrial Electronics (ISCAIE), [Online] Retrieved from the internet: <https://ieeexplore.ieee.org/stamp/stamp.jsp?tp=&arnumber=8405467 (Year: 2018>.

Vishnoi, Laduram, "How Video Chat Can Help to Improve The Digital Banking System", Acquire, [Online]. Retrieved from the Internet: <URL: https://www.google.com/amp/s/acquire.io/blog/video-chat-improve-digital-banking-system/>, (Dec. 23, 2020), 10 pgs.

* cited by examiner

MULTI-LAYER USER AUTHENTICATION WITH LIVE INTERACTION

CROSS-REFERENCE TO RELATED APPLICATION

This application is a continuation of U.S. patent application Ser. No. 16/229,103, filed Dec. 21, 2018, now issued as U.S. Pat. No. 11,171,938, which is incorporated by reference herein in its entirety.

TECHNICAL FIELD

Embodiments described herein generally relate to user authentication and, in some embodiments, more specifically to multi-layer user authentication with live interaction.

BACKGROUND

A user may request secure information from a computing system. The user may interact with the computing system via a web-based user interface, an interactive voice response (IVR) interface, etc. The user may be asked for identification information that may be used to verify the authenticity of the user. The user may be authenticated based on the information provided. However, the user may circumvent the authentication process by providing false information or information of another user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Data may be secured by requiring a user to provide authentication data before accessing the data. The authentication process may ask for user information such as a username, password, name, date of birth, social security number, driver's license number, and the like. The information provided may be compared to a data store of user information and the user may be authenticated if the information matches the user data stored in the data store. However, with the proliferation of the internee and the dark web (e.g., websites containing illicitly obtained and distributed personal data, etc.), user information may be obtained by those intent on committing fraud. For example, a fraudster may obtain the personal information of a user of a financial system and may use that information to authenticate with the financial system. The fraudster may then make changes to the account of the user including changing mailing address, authentication information, etc. The fraudster may then submit a request for a distribution from a financial account that may be delivered to the updated address.

To reduce the incidence of fraudulent authentication, the systems and techniques discussed herein evaluate contextual information (e.g., geography, network topography, communication channel features, authentication information provided, etc.) to determine if the user should be presented additional layers of authentication. For example, the user may be prompted to participate in a live video session with a representative in which the user may be asked to provide additional authentication information. For example, the user may be asked to provide photo identification during the live video session or may be asked to show a unique authentication item (e.g., a unique barcode, letter, etc.). The video data and context data may be stored to provide additional authentication data if the user is authenticated or for use in detecting future fraud by the fraudster if the user fails authentication and is determined to be a fraudster.

In an example, potentially fraudulent transactions may be identified based on a comparison of where a transaction request is coming from and where it is expected to come from. The location of a transaction requestor may be determined. using device location, network information, etc. Additional elements of the communication medium of the request may also be analyzed to identify location information based on noise, anomalies, etc. in the communication medium. The context information may be used to generate a risk score for the user. The transaction may then be escalated, or additional protections may be triggered based on the risk score. In addition, a communication signature may be created for the user that may be added to a fraudster dataset if the transaction turns out to be fraudulent or to a profile for the user if the transaction turns out to be legitimate. The location information may be provided to authorities for use in tracking the fraudster.

Figure 1:
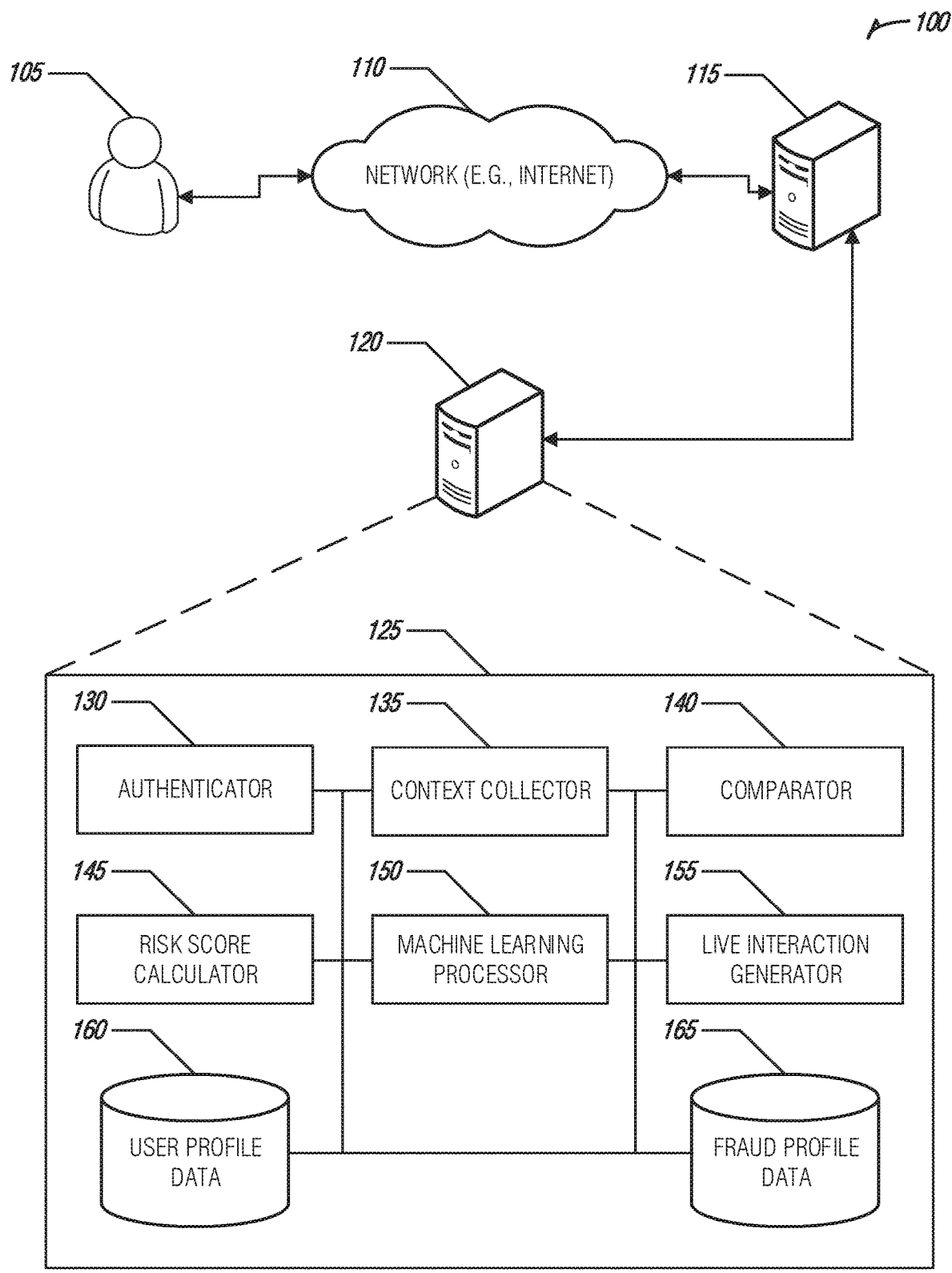
FIG. 1 is a block diagram of an example of an environment and a system for multi-layer user authentication with live interaction, according to an embodiment.

FIG. 1 is a block diagram of an example of an environment 100 and a system 125 for multi-layer user authentication with live interaction, according to an embodiment. The environment 100 may include a user 105 that may be accessing a computer data system 115 (e.g., via an IVR user interface, web-user interface, mobile application interface, etc) over a network 110 (e.g., the internet, cellular network, wired network, wireless network, etc.). The computer data system 115 may be a gateway to other back-end computer data systems and may aggregate retrieved data for presentation of data in a user interface presented to the user via a user device. The computer data system 115 may be communicatively coupled (e.g., via wired network, wireless network, cellular network, shared bus, etc.) to a security management device 120 (e.g., a stand-alone server, a cluster of servers, a cloud-computing platform service, a system on a chip, etc.).

The system 125 may be included with the security management device 120. In an example, the system 125 may be a multi-layer authentication system with live interaction. The system 125 may include a variety of components including an authenticator 130, a context collector 135, a comparator 140, a risk score calculator 145, a machine learning processor 150, a live interaction generator 155, user profile data 160, and fraud profile data 165.

The user 105 may initiate a request for secure data from the computer data system 115 by accessing a user interface provided by the computer data system 115 to a device of the user 105. In an example, the user interface may be a web-based user interface accessed via a computing device (e.g., tablet, laptop computer, desktop computer, smartphone, wearable device, etc.) of the user 105. In another example, the user interface may be an IVR user interface provided to an interactive audio device (e.g., a telephone, smartphone, smart speaker, personal assistant device, etc.) of the user 105. For example, the user 105 may be requesting financial information from the computer data system 115.

The data available from the computer data system 115 may be secured and may require that the user 105 be authenticated before the secure data is provided. The authenticator 130 may receive an authentication request (e.g., via the computer data system 115) from the user 105 for secure data stored in (or accessible through) the computer data system 115. In am example, the authentication request may be received via a web-based user interface or an interactive voice response user interface. For example, the user 105 may request access to a fund distribution application for a financial account and the user 105 may be asked to provide authentication information before the access is allowed. The request for access to the fund distribution application may trigger an authentication process and authentication information may be requested from the user 105.

The context collector 135 may obtain contextual data associated with authentication information received from the user 105. During the authentication process, the user 105 is prompted to provide authentication information such as, for example, a username, a password, identification number (e.g., social security number, driver's license number, account number, etc.), and other personally identifying information (PII). The user 105 may provide the data via a connection to the computer data system 115. The connection may have characteristics that may be observed and collected by the context collector 135. The characteristics may be collected along with other information surrounding the receipt of the authentication information. This contextual information may be used in determining whether additional layers of authentication processing may be used to authenticate the user 105. In an example, the contextual information may include a geographical location of the user 105 (e.g., provided by the user 105, detected via telephone number, network address, etc.), a network topology between a device used to initiate the authentication request and a computing system providing the user interface (e.g., the computer data system 115), line noise present on a communication medium (e.g., telephone line static, background noise, data error rates, etc.) used to initiate the authentication request, a format (e.g., syntactic order, spelling, date format, input mechanism, etc.) in which the authentication information is received, and a veracity (e.g., the correctness of the information provided, likelihood that the information provided could have been illicitly obtained, etc.) of the authentication information received.

The authenticator may work in conjunction with the comparator 140 to determine that the user 105 has passed a first authentication process based on a match between the authentication information and reference authentication information stored in a user profile for the user form the user profile data 160. The user profile data 160 may include a variety of data items that include personal information of the user including name, address, account numbers, identification numbers, usernames, passwords, email addresses, and the like. For example, the user may provide an account number and a social security number and a user profile including the account number may be located in the user profile data and the social security number may be matched to a social security number included in the user profile.

The risk score calculator 145 may generate a risk score for the authentication request based on the contextual data and the authentication data. The risk score may be based on an evaluation of the contextual information using a risk score model to calculate a probability that the authentication information has been provided by an individual to which the user profile corresponds. For example, if the contextual information includes line static and the geographical information shows that the authentication request has been initiated from a location distant from a location of the user in the user profile, the risk score may be higher than contextual information with no line noise and a location in the vicinity of a home address of the user 105 included in the user profile.

In an example, the machine learning processor 150 may generate a risk score model using a set of training data including training contextual data corresponding to fraudulent authentication requests. The contextual information may be evaluated by the risk score calculator 145 using the risk score model to generate the risk score. The machine learning processor 150 may use a variety of supervised and unsupervised machine learning techniques to generate the risk score model including, for example, linear regression, logistic regression, linear discriminant analysis, decision trees, naïve Bayes, nearest neighbors, vector quantization, support vectors, random forest, boosting, neural networks, deep neural networks, and the like. For example, labeled training data including contextual data from fraudulent authentication attempts may be input into the machine learning processor 150 and the machine learning processor 150 may output a risk score model. After initial model creation, the machine learning processor 150 may begin to evaluate additional data from fraudulent authentication attempts to refine the model.

The machine learning processor 150 may also generate (or refine) a risk score model using contextual data from legitimate authentication requests. By using positive and negative data, the risk score calculator 145 may distinguish between potentially fraudulent and potentially legitimate authentication requests based on evaluation of the contextual data. For example, a risk score of 1 may indicate a strong likelihood of a fraudulent authentication request while a risk score of 0 may indicate a strong likelihood of a legitimate authentication request. Scores between 1 and 0 may provide an indication of the likelihood that the authentication request leans toward fraudulent or legitimate.

The authenticator 130 may identify a second authentication process to be completed for the user 105 based on the risk score. The user 105 may be prompted to undergo additional authentication processes based on the likelihood that the authentication request is fraudulent as indicated by the risk score. The authenticator 130 may receive a set of secondary authentication information from the user 105. In an example, it may be determined that the risk score is outside a threshold (e.g., more likely than not that the authentication request is fraudulent, etc). The threshold may be variable depending on the data requested. For example, a fund distribution request may have a lower threshold than a balance inquiry meaning that the fund distribution may have higher detection sensitivity (e.g., a lower likelihood of fraud may trigger another layer of authentication, etc.) to fraudulent requests. A prompt may be transmitted to the user interface indicating that a live video session will be initiated. The live interaction generator 155 may initiate the live video session via a video capable device of the user 105. In an example, the set of secondary authentication information may be received via the live video session. For example, the user may be asked to show a picture identification, a QR code previously mailed to the individual corresponding to the user profile, a letter sent to the individual corresponding to the user profile, and the like. In another example, it may be determined that the risk score is outside a threshold. A prompt may be transmitted to the user interface requesting the set of secondary authentication information and the set of secondary authentication information may be received via the user interface. For example, the user may be prompted to enter additional PII.

Data associated with the authentication request may be transmitted for presentation in the user interface upon authentication of the user 105 via the second authentication process based on the set of secondary authentication data. For example, the user may produce photo identification and it may be determined that the information on the photo identification matches the information in the user profile. In an example, facial recognition techniques may be used to determine a match between a person in the live video session and a photograph on the picture identification. Thus, a match between the user profile, photo identification, and a person participating in the live video session may be established to authenticate the user.

In an example, the authenticator 130 may determine that the second authentication process failed. A prompt may be transmitted to the user interface indicating that a live video session will be initiated. The live video session may be initiated by the live interaction generator 155 via a video capable device of the user 105. A set of tertiary authentication information may be received via the live video session and data associated with the authentication request may be transmitted for presentation in the user interface upon authentication of the user 105 via a third authentication process based on the set of tertiary authentication data. For example, the user 105 may have pass a first authentication process, but the generated risk score may indicate the authentication request was likely fraudulent. The user 105 may be prompted to provide a second set of authentication information for a second authentication process. The user 105 may have failed the second authentication process because the information provided was not accurate. A live video session may be initiated for a third authentication process. This may provide a deterrent for continuing the fraudulent authentication request by a fraudster and may allow additional data such as an image of the fraudster and the surroundings of the fraudster to be captured if the authentication request is fraudulent the third authentication process fails, etc.).

In another example, the authenticator 130 may determine that the second authentication process failed. A fraudulent user profile may be created for the user 105 in the fraud profile database 165 and the contextual information may be stored with the fraudulent user profile. The fraud profile data 165 may include data corresponding to fraudulent authentication requests. The data may include contextual information and PII such as network address, telephone number, etc. The fraud profile data 165 may be referenced for future requests to determine if authentication requests should be allowed. In an example, a second authentication request may be received by the authenticator 130. Second contextual data may be obtained that is associated with second authentication information received from the user 105. The second contextual information may be compared (e.g., by the authenticator 130 in conjunction with the comparator 140) to the contextual information stored with the fraudulent user profile. The second authentication request may be denied based on a similarity between the second contextual information and the contextual information stored with the fraudulent user profile.

In an example, the authenticator 103 may determine that the user 105 was authenticated via the second authentication process and the contextual information may be stored with the user profile in the user profile data 160. The data may be used in authentication of the user during future authentication attempts. In an example, the authenticator 130 may receive a second authentication request. Second contextual data may be obtained that is associated with second authentication information received from the user 105. The second contextual information may be compared (e.g., by the authenticator 130 in conjunction with the comparator 140) to the contextual information stored with the user profile. The user 105 may be authenticated based on a similarity between the second contextual information and the contextual information stored with the user profile.

Figure 2:
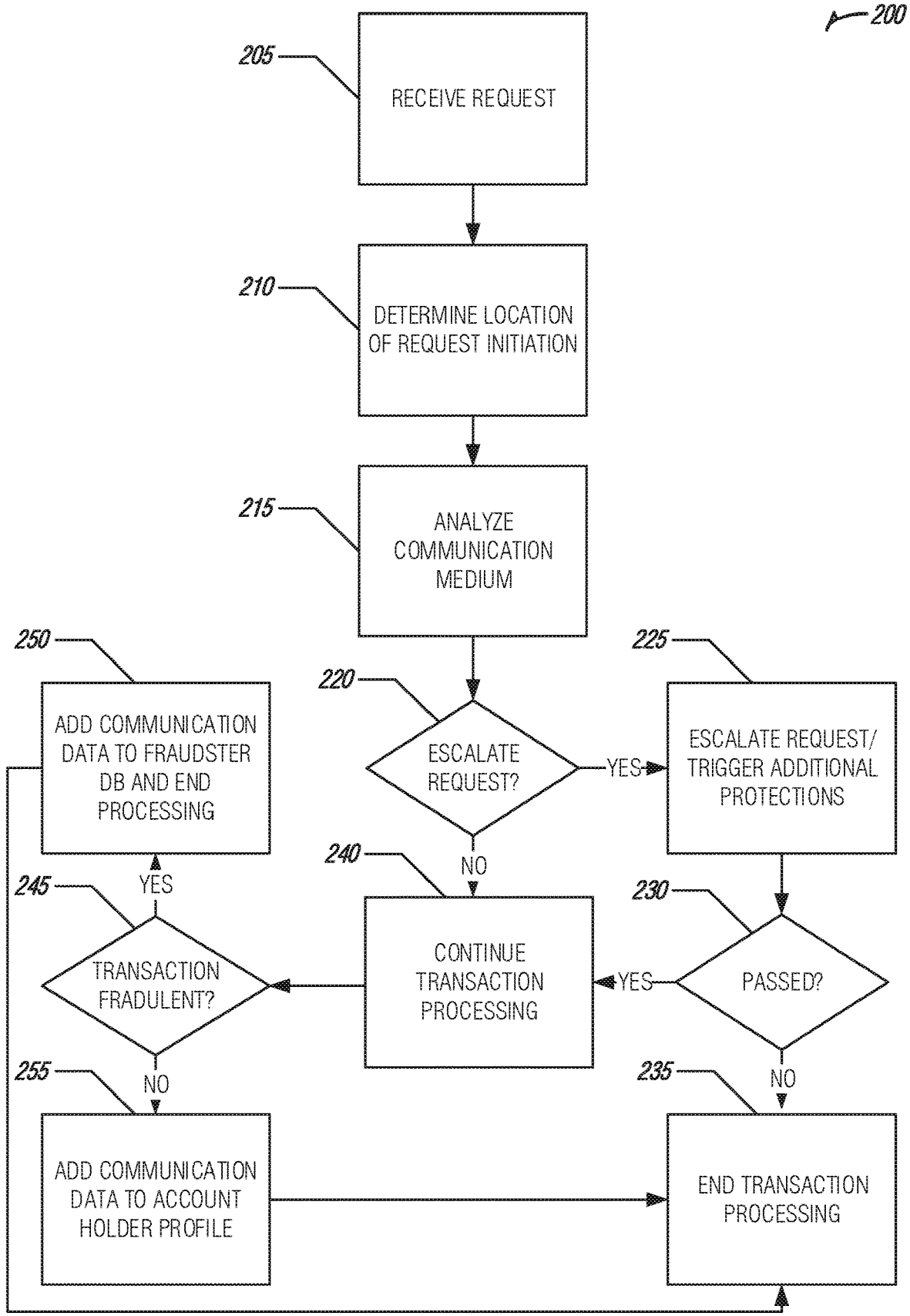
FIG. 2 illustrates a flow diagram of an example of a process for initiating an additional authentication layer for multi-layer user authentication with live interaction, according to an embodiment.

FIG. 2 illustrates a flow diagram of an example of a process 200 for initiating an additional authentication layer for multi-layer user authentication with live interaction, according to an embodiment. The process 200 may provide features as described in FIG. 1.

An authentication request may be received (e.g., by the authenticator 130 as described in FIG. 1, etc.) (e.g., at operation 205). A location of the request initiation may be determined (e.g., by the context collector 135 as described in FIG. 1, etc.) (e.g., at operation 210). The communication medium used to initiate the request may be analyzed (e.g., by the context collector 135 as described in FIG. 1, etc.) to identify characteristics (e.g., line noise, network topography, etc.) (e.g., at operation 215).

It may be determined (e.g., based on a risk score generated by the risk score calculator 145, etc.) whether the request should be escalated (e.g., should the user be presented with an additional authentication process, etc.) (e.g., at decision 220). If so, the user may be presented with an additional authentication process (e.g., by the authenticator 130 as described in FIG. 1, etc.) (e.g., at operation 225). It may be determined (e.g., by the authenticator 130 as described in FIG. 1, etc.) whether the user has passed the additional authentication process (e.g., at decision 230). If not, transaction processing ends (e.g., at operation 235). If the user passes the additional authentication process (e.g., as determined at decision 230), transaction processing continues (e.g., at operation 240). If the request was not subject to escalation (e.g., as determined at decision 220) transaction processing continues (e.g., at operation 240).

It may be determined (e.g., by the authenticator 130 as described in FIG. 1 based on a risk score generated by the risk score generator 145, etc.) if the transaction is fraudulent (e.g., at decision 240). If so, the contextual data including the location and communication characteristics may be added to a fraud profile database (e.g., at operation 250) for use in future fraud detection and transaction processing ends (e.g., at operation 235). If the transaction is determined to be legitimate (e.g., at decision 245) the contextual data including the location and communication characteristics may be added to a user profile database (e.g., at operation 255) for use in future legitimate authentication request detection and transaction processing ends (e.g., at operation 235). The requested data may then be presented to the user.

Figure 3:
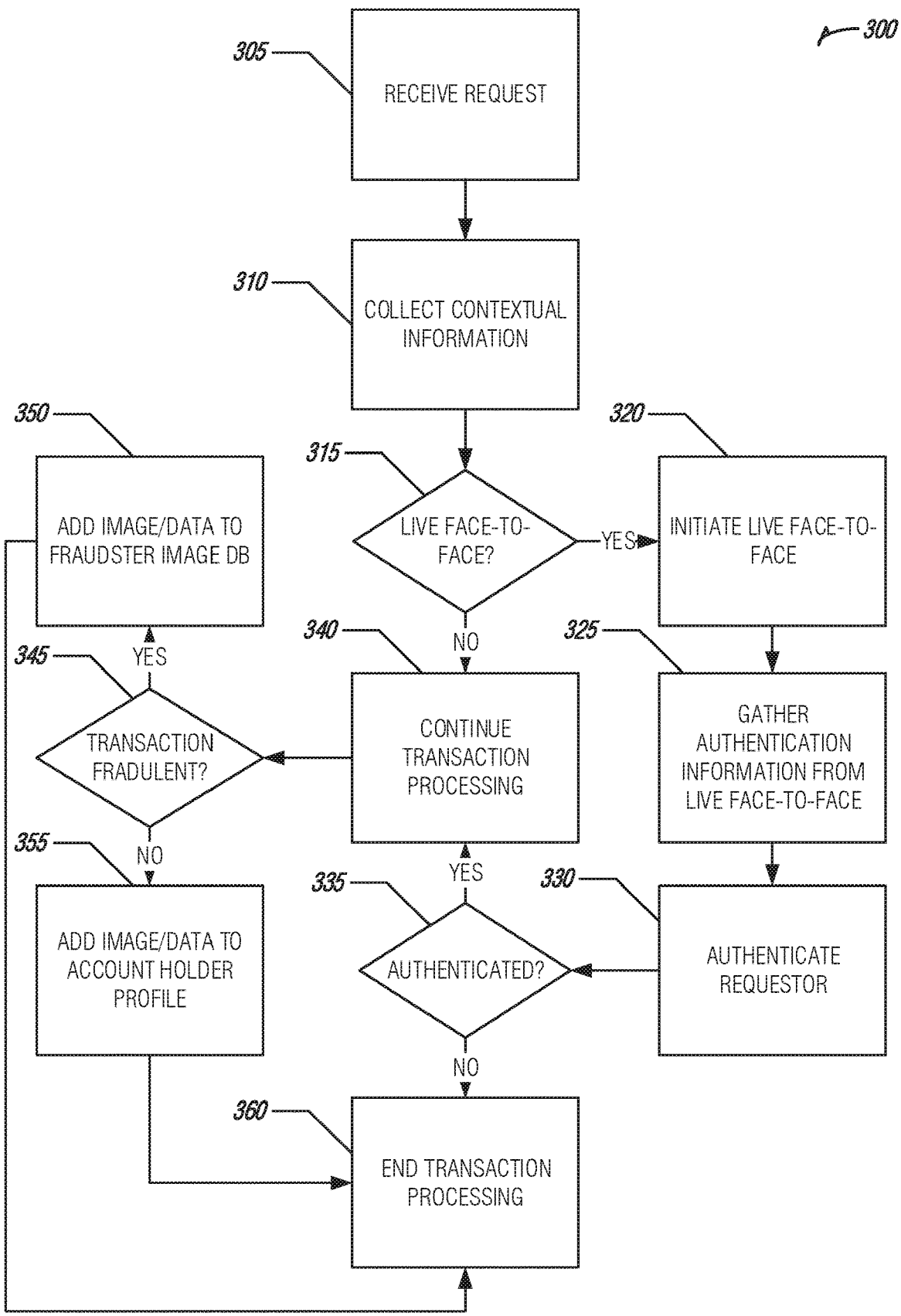
FIG. 3 illustrates a flow diagram of an example of a process for initiating live interaction for multi-layer user authentication with live interaction, according to an embodiment.

FIG. 3 illustrates a flow diagram of an example of a process 300 for initiating live interaction for multi-layer user authentication with live interaction, according to an embodiment. The process 300 may provide features as described in FIG. 1.

An authentication request may be received (e.g., by the authenticator 130 as described in FIG. 1, etc.) (e.g., at operation 305). Contextual information corresponding to the request may be collected (e.g., by the context collector 135 as described in FIG. 1, etc.) (e.g., at operation 310). For example, network topography information, communication medium characteristics, etc. may be collected.

It may be determined (e.g., based on a risk score generated by the risk score calculator 145, etc.) whether a live face-to-face video session should be initiated (e.g., at decision 315). If so, a live video session may be initiated (e.g., by the live interaction generator 155 as described in FIG. 1, etc.) (e.g., at operation 320). Authentication information may be gathered (e.g., by the authenticator 130 as described in FIG. 1, etc.) from the live video session (e.g., at operation 325). An attempt may be made to authenticate the user (e.g., by the authenticator 130 as described in FIG. 1, etc.) (e.g., at operation 330). It may be determined (e.g., by the authenticator 130 as described in FIG. 1, etc.) whether the user has passed the authentication process (e.g., at decision 335). If not, transaction processing ends (e.g., at operation 360). If the user passes the authentication process (e.g., as determined at decision 335), transaction processing continues (e.g., at operation 340). If the request was not subject to a live face-to-face interaction (e.g., as determined at decision 215), transaction processing continues (e.g., at operation 340).

It may be determined (e.g., by the authenticator 130 as described in FIG. 1 based on a risk score generated by risk score generator 145, etc.) if the transaction is fraudulent (e.g., at decision 345). If so, the contextual data including images and data collected from the live video session may be added to a fraud profile database (e.g., at operation 350) for use in future fraud detection and transaction processing ends (e.g., at operation 360). If the transaction is determined to be legitimate (e.g., at decision 345) the contextual data including images and data collected from the live video session may be added to a user profile database (e.g., at operation 355) for use in future legitimate authentication request detection and transaction processing ends (e.g., at operation 360). The requested data may then be presented to the user.

Figure 4:
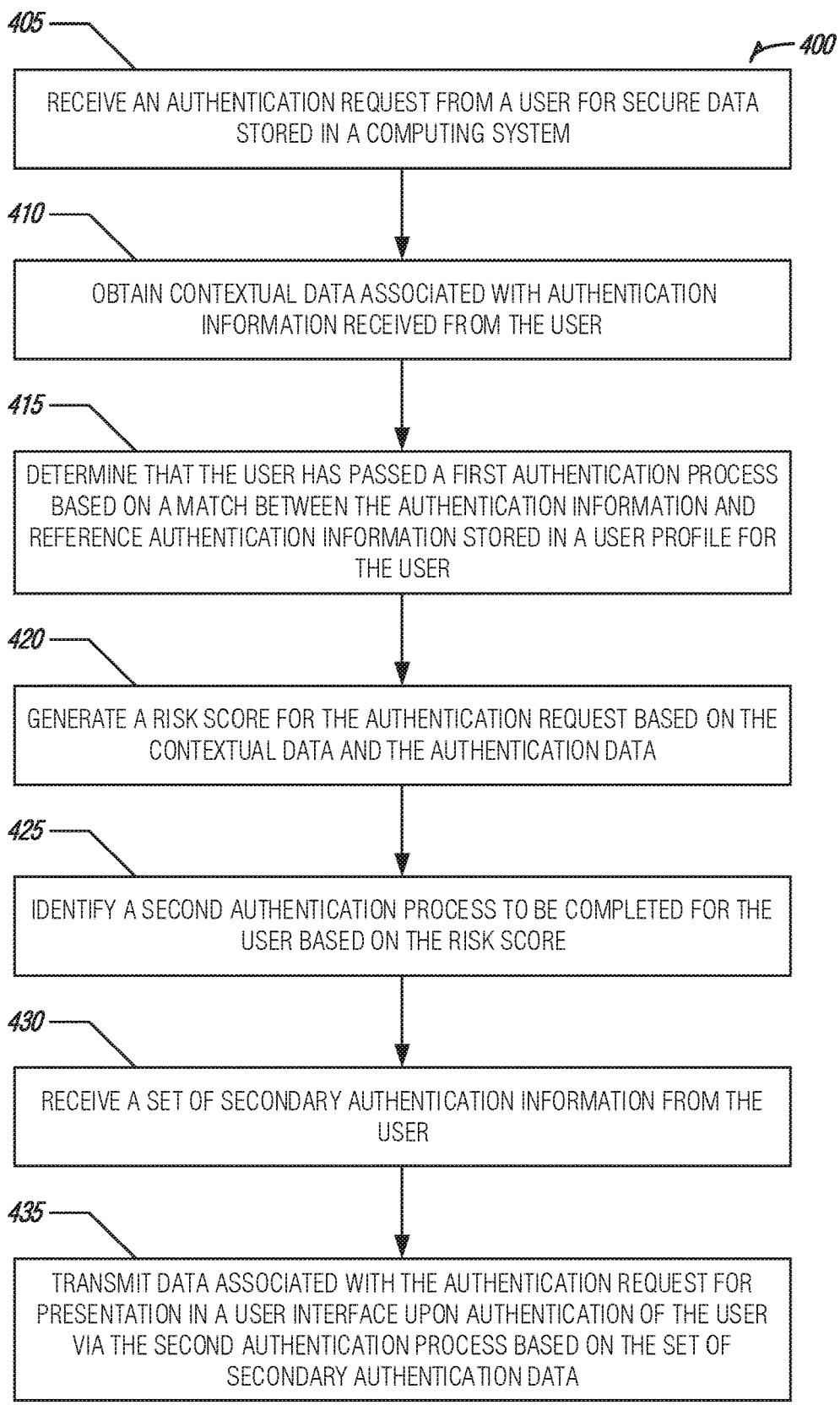
FIG. 4 illustrates a flow diagram of an example of a method for multi-layer user authentication with live interaction, according to an embodiment.

FIG. 4 illustrates a flow diagram of an example of a method 400 for multi-layer user authentication with live interaction, according to an embodiment. The method 400 may provide features as described in FIGS. 1-3.

An authentication request may be received (e.g., by the authenticator 130 as described in FIG. 1, etc.) from a user for secure data stored in a computing system (e.g., at operation 405). In an example, the authentication request is received via a web-based user interface or an interactive voice response user interface.

Contextual data may be obtained (e.g., by the context collector 135 as described in FIG. 1, etc.) that is associated with authentication information received from the user (e.g., at operation 410). In an example, the contextual information includes at least one of the set of a geographical location of the user, a network topology between a device used to initiate the authentication request and a computing system providing the user interface, line noise present on a communication medium used to initiate the authentication request, a format in which the authentication information is received, and a veracity of the authentication information received.

It may be determined (e.g., by the authenticator 130 as described in FIG. 1, etc.) that the user has passed a first authentication process based on a match (e.g., as determined by the comparator 135 as described in FIG. 1, etc.) between the authentication information and reference authentication information stored in a user profile for the user (e.g., at operation 415).

A risk score may be generated (e.g., by the risk score calculator 145 as described in FIG. 1, etc.) for the authentication request based on the contextual data and the authentication data (e.g., at operation 420). In an example, a risk score model may be generated (e.g., by the machine learning processor 150 as described in FIG. 1, etc.) using a set of training data including training contextual data corresponding to fraudulent authentication requests. The contextual information may be evaluated using the risk score model and the risk score may be generated based on the evaluation.

A second authentication process may be identified (e.g., by the authenticator 130 as described in FIG. 1, etc.) to be completed for the user based on the risk score (e.g., at operation 425).

A set of secondary authentication information may be received (e.g., by the authenticator 130 as described in FIG. 1, etc.) from the user (e.g., at operation 430). In an example, it may be determined that the risk score is outside a threshold. A prompt may be transmitted to the user interface indicating that a live video session will be initiated, and the live video session may be initiated (e.g., by the live interaction generator 165 as described in FIG. 1, etc.) via a video capable device of the user. The set of secondary authentication information may be received via the live video session. In another example, it may be determined that the risk score is outside a threshold. A prompt may be transmitted to the user interface requesting the set of secondary authentication information and the set of secondary authentication information may be received via the user interface.

Data associated with the authentication request may be transmitted for presentation in a user interface upon authentication (e.g., by the authenticator 130 as described in FIG. 1, etc.) of the user via the second authentication process based on the set of secondary authentication data (e.g., at operation 435).

In an example, it may be determined that the second authentication process failed. A prompt may be transmitted to the user interface indicating that a live video session will be initiated, and the live video session may be initiated (e.g., by the live interaction generator 165 as described in FIG. 1, etc.) via a video capable device of the user. A set of tertiary authentication information may be received via the live video session. Data associated with the authentication request may be transmitted for presentation in the user interface upon authentication of the user via a third authentication process based on the set of tertiary authentication data.

In another example, it may be determined that the second authentication process failed. A fraudulent user profile may be generated for the user and the contextual information may be stored with the fraudulent user profile. In an example, a second authentication request may be received. Second contextual data may be obtained that is associated with second authentication information received from the user. The second contextual information may be compared to the contextual information stored with the fraudulent user profile and the second authentication request may be denied based on a similarity between the second contextual information and the contextual information stored with the fraudulent user profile.

In yet another example, it may be determined that the user was authenticated via the second authentication process and the contextual information may be stored with the user profile. In an example, a second authentication request may be received. Second contextual data may be obtained that is associated with second authentication information received from the user. The second contextual information may be compared to the contextual information stored with the user profile and the user may be authenticated based on a similarity between the second contextual information and the contextual information stored with the user profile.

Figure 5:
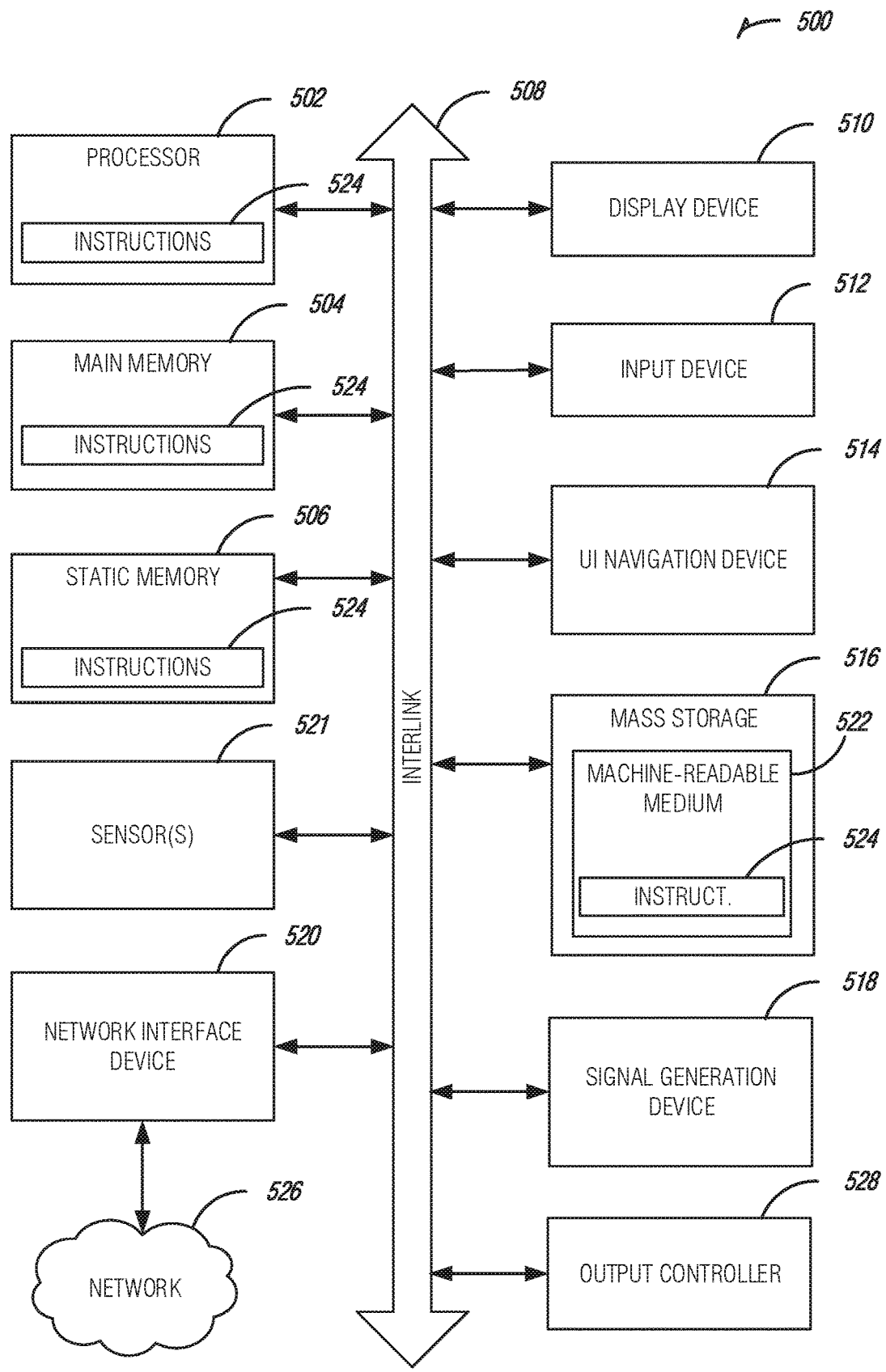
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation hardwired). In an example, the hardware of the circuit set may include variably connected physical components (e.g., execution units, transistors, simple circuits, etc.) including a computer readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for multi-layer user authentication, the system comprising:
    at least one processor; and
    memory including instructions that, when executed by the at least one processor, cause the at least one processor to perform operations to:
    receive an authentication request from a user for secure data stored in a computing system;
    determine that a user has passed a first authentication process;
    generate a risk score for the authentication request based on contextual data associated with the authentication request;
    receive a set of secondary authentication information from the user via a secondary authentication process triggered by the risk score; and
    transmit secure data to a user interface upon completion of the secondary authentication process.

2. The system of claim 1, wherein the authentication request is received via a web-based user interface or an interactive voice response user interface.

3. The system of claim 1, wherein the contextual data includes at least one of a geographical location of the user, a network topology between a device used to initiate the authentication request and a computing system providing the user interface, line noise present on a communication medium used to initiate the authentication request, a format in which authentication information for the first authentication process is received, and a veracity of the authentication information for the first authentication process.

4. The system of claim 1, the memory further including instructions that when executed by the at least one processor, cause the at least one processor to perform operations to:
    determine that the risk score is outside a threshold;
    transmit a prompt to the user interface that indicates that a live video session will be initiated; and
    initiate the live video session via a video capable device of the user, wherein the set of secondary authentication information is received via the live video session.

5. The system of claim 1, the memory further including instructions that when executed by the at least one processor, cause the at least one processor to perform operations to:
    determine that the risk score is outside a threshold;

transmit a prompt to the user interface that requests the set of secondary authentication information; and
receive the set of secondary authentication information via the user interface.

6. The system of claim 1, the memory further including instructions that when executed by the at least one processor, cause the at least one processor to perform operations to:
determine that the secondary authentication process failed;
transmit a prompt to the user interface that indicates that a live video session will be initiated;
initiate the live video session via a video capable device of the user;
receive a set of tertiary authentication information via the live video session; and
transmit data associated with the authentication request for presentation in the user interface upon authentication of the user via a third authentication process based on the set of tertiary authentication information.

7. The system of claim 1, the memory further including instructions that when executed by the at least one processor, cause the at least one processor to perform operations to:
generate a risk score model, by a machine learning processor, using a set of training data that includes training contextual data that corresponds to fraudulent authentication requests; and
evaluate the contextual data through use of the risk score model, wherein the risk score is generated based on the evaluation of the contextual data.

8. At least one non-transitory machine-readable medium including instructions for multi-layer user authentication that, when executed by at least one processor, cause the at least one processor to perform operations to:
receive an authentication request from a user for secure data stored in a computing system;
determine that a user has passed a first authentication process;
generate a risk score for the authentication request based on contextual data associated with the authentication request;
receive a set of secondary authentication information from the user via a secondary authentication process triggered by the risk score; and
transmit secure data to a user interface upon completion of the secondary authentication process.

9. The at least one non-transitory machine-readable medium of claim 8, further including instructions that when executed by the at least one processor, cause the at least one processor to perform operations to:
determine that the risk score is outside a threshold;
transmit a prompt to the user interface that indicates that a live video session will be initiated; and
initiate the live video session via a video capable device of the user, wherein the set of secondary authentication information is received via the live video session.

10. The at least one non-transitory machine-readable medium of claim 8, further including instructions that when executed by the at least one processor, cause the at least one processor to perform operations to:
determine that the risk score is outside a threshold;
transmit a prompt to the user interface that requests the set of secondary authentication information; and
receive the set of secondary authentication information via the user interface.

11. The at least one non-transitory machine-readable medium of claim 8, further including instructions that when executed by the at least one processor, cause the at least one processor to perform operations to:
determine that the secondary authentication process failed;
transmit a prompt to the user interface that indicates that a live video session will be initiated;
initiate the live video session via a video capable device of the user;
receive a set of tertiary authentication information via the live video session; and
transmit data associated with the authentication request for presentation in the user interface upon authentication of the user via a third authentication process based on the set of tertiary authentication information.

12. The at least one non-transitory machine-readable medium of claim 8, further including instructions that when executed by the at least one processor, cause the at least one processor to perform operations to:
determine that the secondary authentication process failed;
generate a fraudulent user profile for the user; and
store the contextual data with the fraudulent user profile.

13. The at least one non-transitory machine-readable medium of claim 12, further including instructions that when executed by the at least one processor, cause the at least one processor to perform operations to:
receive a second authentication request;
obtain second contextual data associated with second authentication information received from the user;
compare the second contextual data to the contextual data stored with the fraudulent user profile; and
deny the second authentication request based on a similarity between the second contextual data and the contextual data stored with the fraudulent user profile.

14. A method for multi-layer user authentication, the method comprising:
receiving an authentication request from a user for secure data stored in a computing system;
determining that a user has passed a first authentication process;
generating a risk score for the authentication request based on contextual data associated with the authentication request;
receiving a set of secondary authentication information from the user via a secondary authentication process triggered by the risk score; and
transmitting secure data to a user interface upon completion of the secondary authentication process.

15. The method of claim 14, further comprising:
determining that the risk score is outside a threshold;
transmitting a prompt to the user interface indicating that a live video session will be initiated; and
initiating the live video session via a video capable device of the user, wherein the set of secondary authentication information is received via the live video session.

16. The method of claim 14, further comprising:
determining that the risk score is outside a threshold;
transmitting a prompt to the user interface requesting the set of secondary authentication information; and
receiving the set of secondary authentication information via the user interface.

17. The method of claim 14, further comprising:
determining that the secondary authentication process failed;
transmitting a prompt to the user interface indicating that a live video session will be initiated;

initiating the live video session via a video capable device of the user;

receiving a set of tertiary authentication information via the live video session; and transmitting data associated with the authentication request for presentation in the user interface upon authentication of the user via a third authentication process based on the set of tertiary authentication information.

18. The method of claim 14, further comprising:

generating a risk score model, by a machine learning processor, using a set of training data including training contextual data corresponding to fraudulent authentication requests; and evaluating the contextual data using the risk score model, wherein the risk score is generated based on the evaluation of the contextual data.

19. The method of claim 14, further comprising:

determining that the secondary authentication process failed;

generating a fraudulent user profile for the user; and storing the contextual data with the fraudulent user profile.

20. The method of claim 19, further comprising:

receiving a second authentication request;

obtaining second contextual data associated with second authentication information received from the user;

comparing the second contextual data to the contextual data stored with the fraudulent user profile; and denying the second authentication request based on a similarity between the second contextual data and the contextual data stored with the fraudulent user profile.

* * * * *

UNITED STATES PATENT AND TRADEMARK OFFICE
CERTIFICATE OF CORRECTION

PATENT NO. : 11,695,746 B2
APPLICATION NO. : 17/453939
DATED : July 4, 2023
INVENTOR(S) : Hamm et al.

Page 1 of 1

It is certified that error appears in the above-identified patent and that said Letters Patent is hereby corrected as shown below:

On the Title Page

On page 2, in Column 1, Item (56) under "U.S. Patent Documents", Line 23, delete "2018/0004151" and insert --2018/0041510-- therefor Signed and Sealed this
Twenty-sixth Day of September, 2023

Katherine Kelly Vidal
*Director of the United States Patent and Trademark Office*